United States Patent [19]

Arnold

[11] Patent Number: 5,228,681
[45] Date of Patent: Jul. 20, 1993

[54] APPARATUS FOR DIVERTING SHEETS

[75] Inventor: Carl B. Arnold, Christiana, Del.

[73] Assignee: E. I. Du Pont de Nemours and Company, Wilmington, Del.

[21] Appl. No.: 796,520

[22] Filed: Nov. 22, 1991

[51] Int. Cl.⁵ ............................................. B65H 39/10
[52] U.S. Cl. ...................................... 271/303; 271/274
[58] Field of Search ................... 271/65, 184, 303, 304, 271/305, 902, 273, 274

[56] References Cited

U.S. PATENT DOCUMENTS

| | | | |
|---|---|---|---|
| 2,917,168 | 12/1959 | Faeber | 271/303 X |
| 3,206,191 | 9/1965 | Hantscho | 271/303 X |
| 4,326,636 | 4/1982 | Kawakami | 271/305 X |
| 4,482,146 | 11/1984 | Hoorn | 271/127 |
| 4,521,008 | 6/1985 | Granzow et al. | 271/305 X |
| 4,699,365 | 10/1987 | Smith et al. | 271/303 X |
| 4,709,913 | 12/1987 | Cagey | 271/207 |
| 4,842,262 | 6/1989 | Carrish | 271/902 X |
| 4,986,529 | 1/1991 | Agarwal et al. | 271/303 X |
| 5,083,764 | 1/1992 | Chambers | 271/106 |

FOREIGN PATENT DOCUMENTS

| | | | |
|---|---|---|---|
| 295636 | 12/1988 | European Pat. Off. | 271/303 |
| 140455 | 6/1986 | Japan | 271/303 |
| 230469 | 9/1988 | Japan | 271/303 |

Primary Examiner—Robert P. Olszewski
Assistant Examiner—Boris Milef

[57] ABSTRACT

The invention relates to an apparatus for diverting a sheet having a leading edge to a first position or a second position. The apparatus comprises a first roller, a second roller, a third roller, a fourth roller and a diverter assembly. The first roller has segments separated by first gaps. The second roller has segments separated by second gaps. The second roller segments form incoming nips with the first roller segments. The third roller has segments separated by third gaps. The third roller segments form first exit nips with the first roller segments. The fourth roller has segments separated by fourth gaps. The fourth roller segments form second exit nips with the second roller segments. The diverter assembly has diverter segments positionable within at least one of the first gaps, the second gaps, the third gaps and the fourth gaps. The diverter assembly is for directing the leading edge of the sheet from the incoming nips to the first exit nips or the second exit nips.

7 Claims, 13 Drawing Sheets

APPARATUS FOR DIVERTING SHEETS

BACKGROUND OF THE INVENTION

1. Field of the Invention

This invention relates to an apparatus for diverting a sheet or a film to one of at least two paths, in particular, in automatic film handling systems.

2. Description of Related Art

Until the advent of automatic film handling systems, film sheets, and in particular X-ray film sheets, were handled manually by loading the film sheet into a cassette in the dark, exposing it under daylight conditions and then taking the cassette into a darkroom, opening it and placing the film sheet into a processor all in the dark. Various systems are available for the handling of photographic film sheets, and in particular X-ray film sheets (or radiographs), in daylight conditions.

One such system for automatic daylight handling of film in a cassette is an apparatus which automatically opens the cassette, removes an exposed film sheet, places an unexposed sheet into the cassette, closes the cassette and ejects the reloaded cassette to an operator; during which time the exposed film sheet is transported to a film processor for development. However, efforts to increase the productivity of the film handling apparatus to quickly unload and load cassettes is limited by a time lag between the unloading and transporting of the exposed film to the processor and the time required for the film processing. Typically the time required for film processing is longer than the time to unload and transport the film. Recently, it has been proposed that this time differential may be resolved by including an intermediate storage device with the daylight film handling apparatus which equalizes the time lag between the two operations by receiving the exposed film, storing the film, and dispensing the film to the processor for processing at the development speed.

As a result, there is a need in film handling apparatus to provide an apparatus for directing an exposed film from the cassette to one of two paths, a first path toward an intermediate film storage device and a second path toward a film processor.

SUMMARY OF THE INVENTION

In accordance with this invention, there is provided an apparatus for diverting a sheet having a leading edge to a first position or a second position, comprising:

a first roller having segments separated by first gaps;

a second roller having segments separated by second gaps, the second roller segments forming incoming nips with the first roller segments;

a third roller having segments separated by third gaps, the third roller segments forming first exit nips with the first roller segments;

a fourth roller having segments separated by fourth gaps, the fourth roller segments forming second exit nips with the second roller segments; and a diverter assembly having diverter segments positionable within at least one of the first gaps, the second gaps, the third gaps and the fourth gaps, the diverter assembly for directing the leading edge of the sheet from the incoming nips to the first exit nips or the second exit nips.

BRIEF DESCRIPTION OF THE DRAWINGS

The invention can be more fully understood from the following detailed description thereof in connection with the accompanying drawings described as follows.

DESCRIPTION OF THE PREFERRED EMBODIMENT(S)

Throughout the following detailed description, similar reference characters refer to similar elements in all figures of the drawings.

Figure 1:
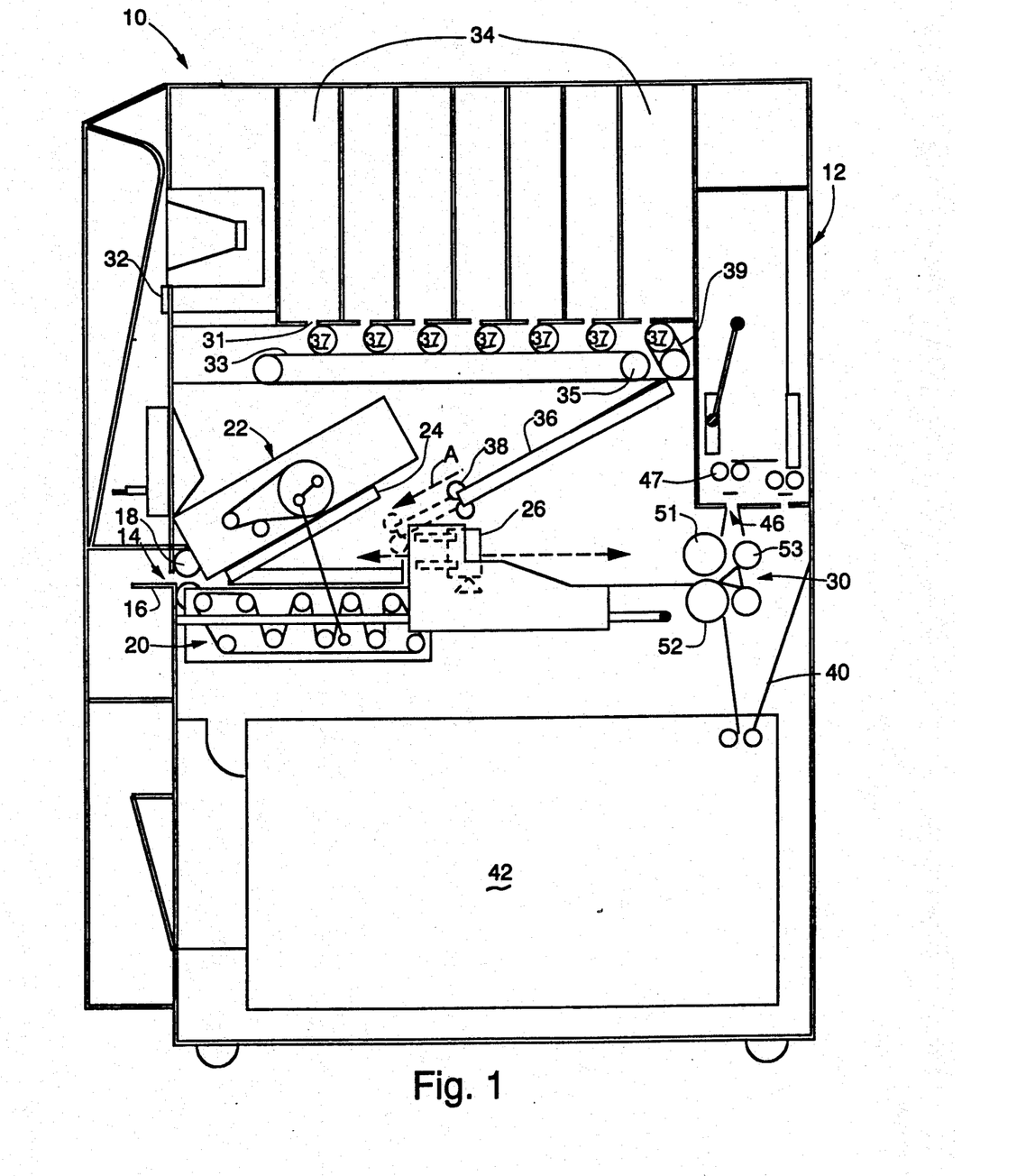
FIG. 1 is a simplified schematic cross-sectional view of an automatic film handling apparatus including a schematic representation of a diverter apparatus for diverting sheets in accordance with the present invention.

Referring to FIG. 1, an automatic daylight film handling apparatus 10 is shown with a sheet diverting apparatus 30 of this invention. The operation of the automatic film handling apparatus 10 begins by an operator inserting a closed cassette having an exposed film into an entrance slot 14 adjacent a feed tray 16 in the film handling apparatus 10. The slot 14 has a light gate (not depicted) which opens and closes to allow the cassette into the apparatus 10 and yet prevents light from entering into an interior of the apparatus 10. A pair of nip rollers 18 inside the entrance slot 14 initially transport the cassette from the feed tray 16. A plurality of rollers 20 transports the cassette further into a cassette opening-closing assembly 22. During transport of the cassette into the opening-closing assembly 22, the cassette is aligned to a front corner of the opening-closing assembly 22. The opening-closing assembly 22 opens the cassette by disengaging latches on the cassette and lifting a door of the cassette. Exposed film in the opened cassette 24 is removed from the cassette 24 by a vacuum-operated lifting assembly 26 which lifts and transports the exposed film to a first roller 51 and a second roller 52 of the film or sheet diverting apparatus 30 of this invention. For example, the vacuum-operated lifting assembly 26 can be as disclosed in U.S. Pat. No. 5,083,764. The operator may input at a console 32 associated with the film handling apparatus 10 the type of film desired for the re-loading of the cassette 24. Alternately, a microcomputer (not depicted) associated with the apparatus 10 can determine the type of film needed from a sensor (not depicted) reading a label on the cassette 24. An appropriate fresh, i.e., non-exposed, film is dispensed from one of a plurality of film storage magazines 34 through a dispensing slot 31 onto a first endless belt 33 which is driven by a roller 35. For a detailed description of a suitable film storage magazine 34 that can be used as stated herein, see U.S. Pat. No. 4,482,146. The first belt 33 is moving clockwise in FIG. 1 when a fresh film is dispensed so that a leading edge of the fresh film is directed to a nip formed between a top surface or run of the first belt 33 and a roller 37 substantially below the film storage magazine 34 and beside the dispensing slot 31. Since each roller 37 associated with a film storage magazine 34 forms a nip between itself and the top run of the first belt 33, the fresh film is transported on the first belt 33 to a nip formed between the first belt 33 and a second endless belt 39. The second belt 39 is driven by frictional contact with the first belt 33 and is moving counter-clockwise in FIG. 1. When the leading edge of the film contacts the second belt 39, the film is directed into the nip between the first belt 33 and second belt 39 and the film is transported to a chute 36. (It should be understood that each of the first endless belt and the second endless belt can include one or more belts.) The fresh film travels down the chute 36 to a pair of nip rollers 38 which hold the fresh film and extend in the direction of arrow A in FIG. 1 to place the fresh film into the opened cassette 24. The opening-closing assembly 22 closes the cassette 24 and secures the latches on the cassette 24. The plurality of rollers 20 transport the cassette 24 from the opening-closing assembly 22 and eject the cassette onto the feed tray 16.

Meanwhile, a sensor (not shown) detects the presence of the exposed film at a nip between the first roller 51 and the second roller 52 of the sheet diverting apparatus 30 of this invention and sends the film presence information to the microcomputer. The microcomputer also receives information from a second sensor on the presence of another film in a feed tray 40 of a processor 42 associated with the film handling apparatus 10. The microcomputer determines whether the film can be transported directly into the processor 42 or should be transported into an intermediate film storage apparatus 12 associated with the film handling apparatus 10 for dispensing at a later time, and directs the movement of the sheet diverting apparatus 30 to thereby guide the exposed film to the appropriate path accordingly. In the case where the film is directed into the intermediate film storage apparatus 12, the film is transported vertically or substantially vertically by the first roller 51 and a third roller 53 of the diverting apparatus 30 into the entrance 46 of the intermediate storage apparatus 12 and to a nip between a pair of rollers 47, such as, within the storage apparatus 12. For a detailed description of a suitable intermediate film storage apparatus 12 that can be used as stated herein, see U.S. patent application Ser. No. 07/797,486 filed Nov. 22, 1991 and assigned to the assignee of the present invention.

Figure 2:
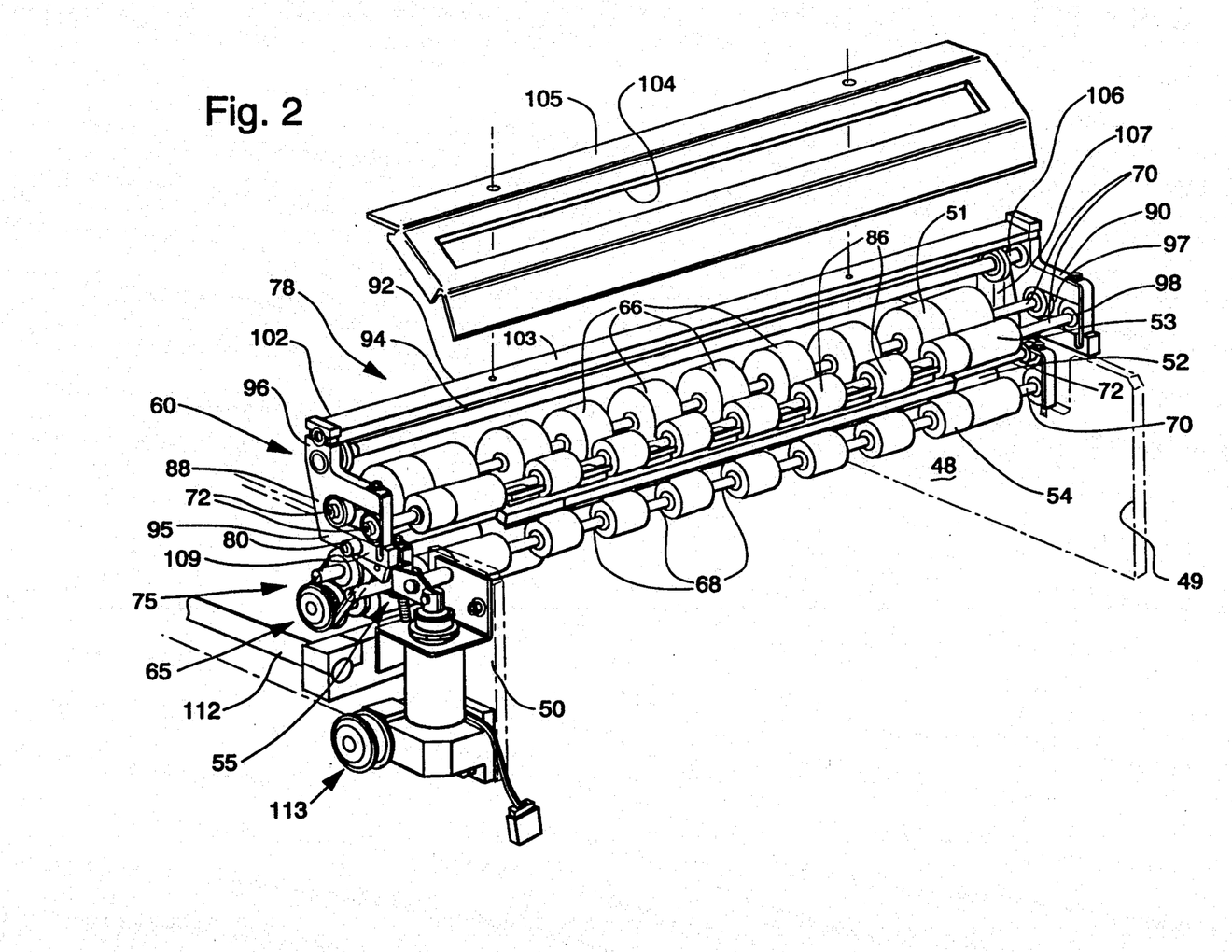
FIG. 2 is a perspective view of the diverter apparatus including an upper assembly and a lower assembly.

Referring to FIG. 2, a perspective view of the apparatus 30 for diverting a sheet to one of at least two paths is shown. The diverting apparatus 30 is supported in the film handling apparatus 10 by a subframe 48 having a left side 49 and a right side 50 shown in phantom lines. The diverting apparatus 30 includes the first roller 51, the second roller 52, the third roller 53, a fourth roller 54, and a diverter assembly 55 which are arranged in an upper assembly 60 and a lower assembly 65. The first 51, second 52, third 53 and fourth 54 rollers are segmented. The segments or segmented portions 66 of the rollers 51, 52, 53, 54 can be formed by individual rollers mounted to a shaft in a spaced relationship or by a solid roller which has been ground down about a shaft to create the segmented portions 66. Between the segmented portions 66 of each of the first 51, second 52, third 53 and fourth 54 rollers are gaps 68. The segments 66 and the gaps 68 can have similar or varying lengths. Each of the first 51, second 52, third 53 and fourth 54 rollers are mounted on shafts 70. Bearings 72 are mounted on each end of the shafts 70. The second roller 52 is driven by a motor assembly 75 as will be described later in this specification. The first 51, third 53 and fourth 54 rollers are idle rollers and rotate due to frictional contact with the driven second roller 52, or with an idle roller contacting the driven second roller 52, and/or the film being transported by the driven second roller 52. The segments 66 of the second roller 52 form incoming nips 76 (shown in FIG. 5a) with the segments 66 of first roller 51. Frictional contact of the first roller 51 segments 66 on the second roller 52 segments is maintained by the gravity of the first roller 51 and the upper assembly 60 on the second roller 52.

Figure 2A:
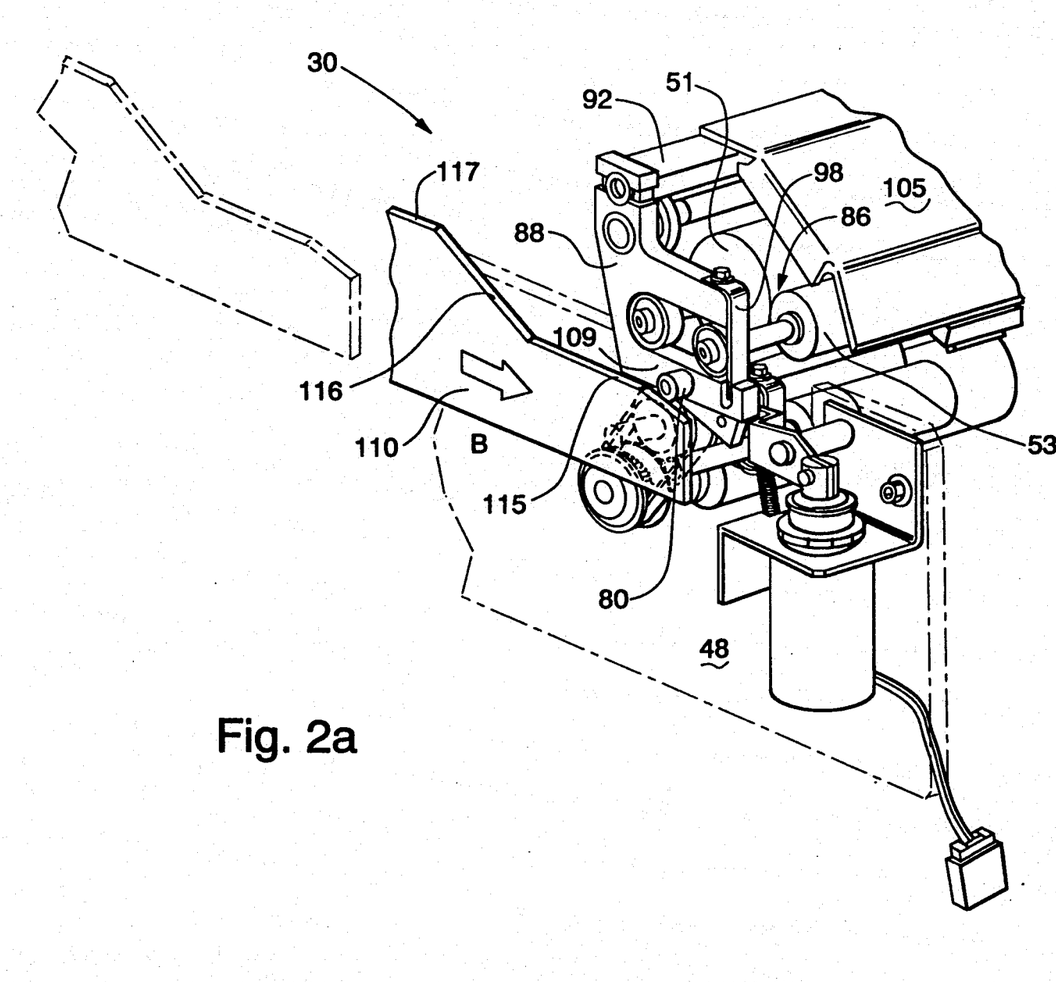
FIG. 2a is a perspective view of a right side of the diverter apparatus including the lower assembly and a cam.
Figure 3:
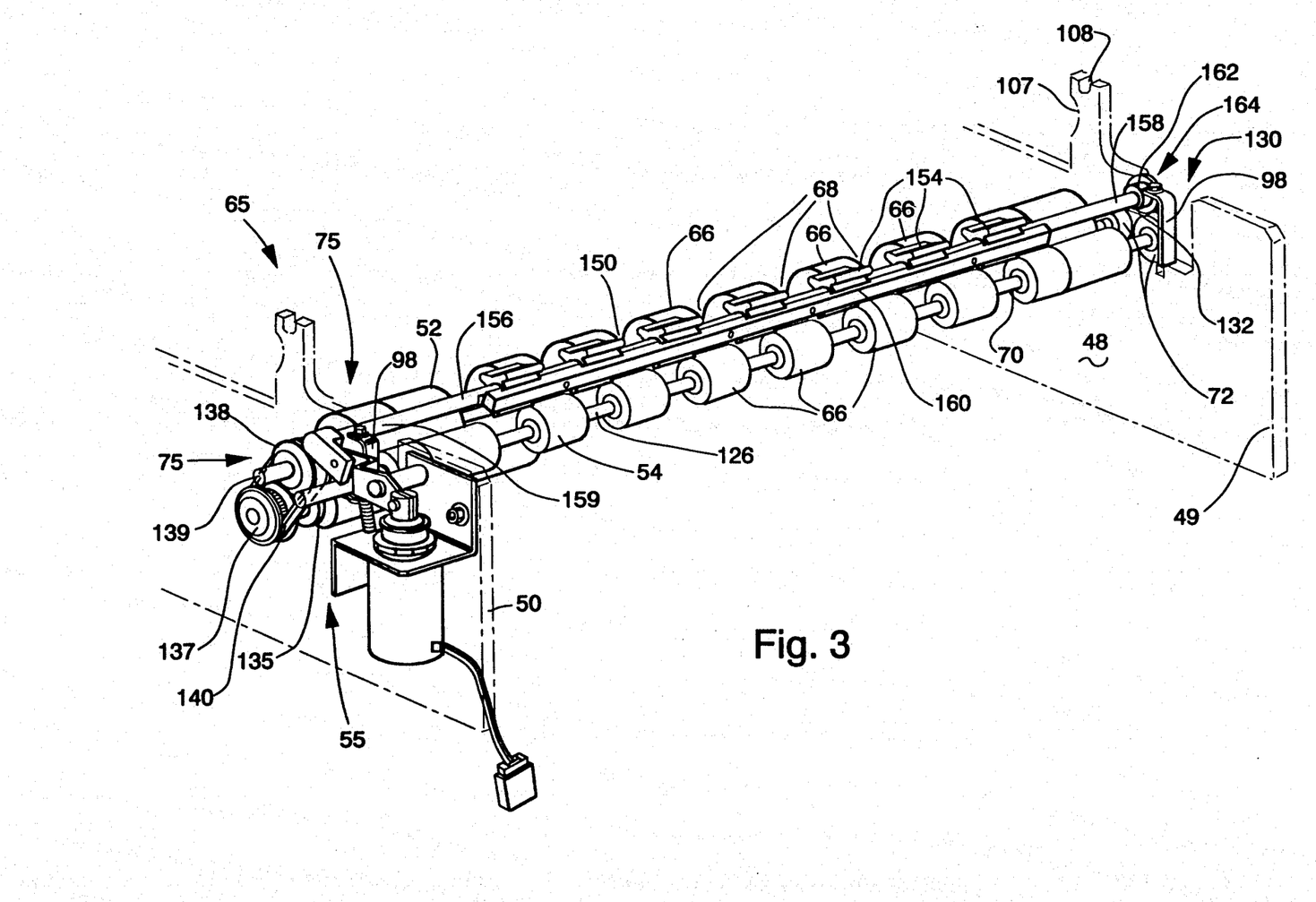
FIG. 3 is a perspective view of the lower assembly of the diverter apparatus.

Referring to FIG. 2 and 2a, the upper assembly 60 of the diverting apparatus 30 includes the first roller 51, the third roller 53, a yoke assembly 78 and a cam follower bearing 80. The segments 66 of the third roller 53 form first exit nips 86 with the segments 66 of the first roller 51. The yoke assembly 78 includes two yoke housing members 88, 90, a crossbar 92, and a yoke shaft 94. The yoke housing members 88, 90 are substantially L-shaped having a substantially horizontal leg 95 and a substantially vertical leg 96. The substantially horizontal legs 95 of the yoke housing members 88, 90 have cutout portions 97 in which the bearings 72 on the shafts 70 of the first 51 and third 53 rollers reside. The segments 66 of the first roller 51 are kept in frictional contact with the segments 66 of the third 53 rollers by a cantilevered spring 98 mounted across an opening in the cutout portion 97 on each of the yoke housing members 88, 90. The cantilevered springs 98 bias the segments 66 of the third roller 53 against the segments 66 of the first roller 51 by restricting the bearings 72 of the first 51 and third 53 rollers in the cutout portion 97. The crossbar 92 has distal ends 102 and a top surface 103. The substantially vertical leg 96 of each of the yoke housing members 88, 90 are coupled to the distal ends 102 of the crossbar 92. A guard plate 105 having a first exit opening 104 is mounted to the top surface 103 of the crossbar 92. The yoke shaft 94 is mounted to the substantially vertical legs 96 of the yoke housing members 88, 90. A collar 106 is mounted around and near each end of the yoke shaft 94 connecting the yoke shaft 94 to the yoke housing members 88, 90. The left 49 and right 50 sides of the subframe 48 have extended upright portions 107 which have a first groove 108 (shown in FIG.

3). The yoke shaft 94 resides in the first grooves 108 of the subframe 48 to support the upper assembly 60 of the diverting apparatus 30. The upper assembly 60 pivots about the yoke shaft 94 in the first grooves 108 when a sheet is incoming to the diverting apparatus 30. Referring to FIG. 2a, the cam follower bearing 80 is mounted on an exterior side 109 of one of the yoke housing members 88. The cam follower bearing 80 is positioned on the substantially horizontal leg 95 of the yoke housing member 88 so that the cam follower bearing 80 engages a cam 110, when a sheet is incoming to the diverting apparatus 30. The cam 110 is coupled to a carrier transporting mechanism for the vacuum-operated lifting assembly 26 and moves with the carrier transporting mechanism for the lifting assembly 26 as shown in phantom lines. The cam 110 has a first surface 115, a ramp surface 116 and a second surface 117 on which the cam follower bearing 80 can engage and ride upon. The carrier transporting mechanism which moves on a rod 112 (as shown in FIG. 2) along the right side 50 of the subframe 48 may comprise a drive belt or chain connected to pulleys or gears 113, one of which is on a shaft of a motor assembly (not depicted).

Figure 3A:
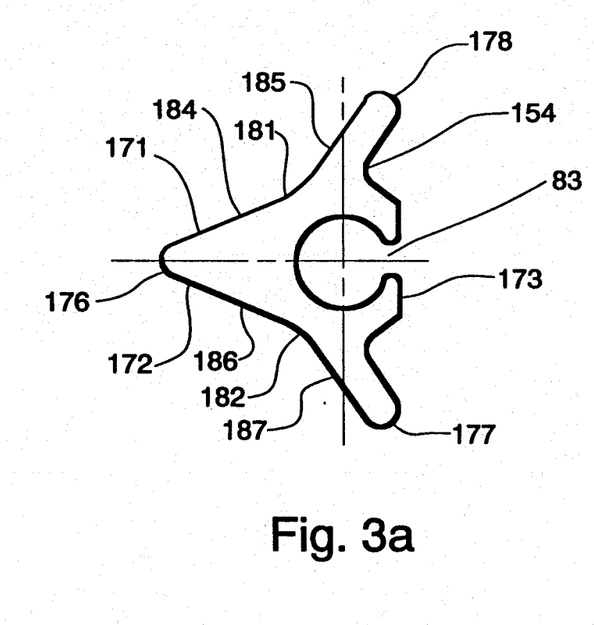
FIG. 3a is a cross-sectional view of a diverter segment used in a diverter assembly of the lower assembly.
Figure 4:
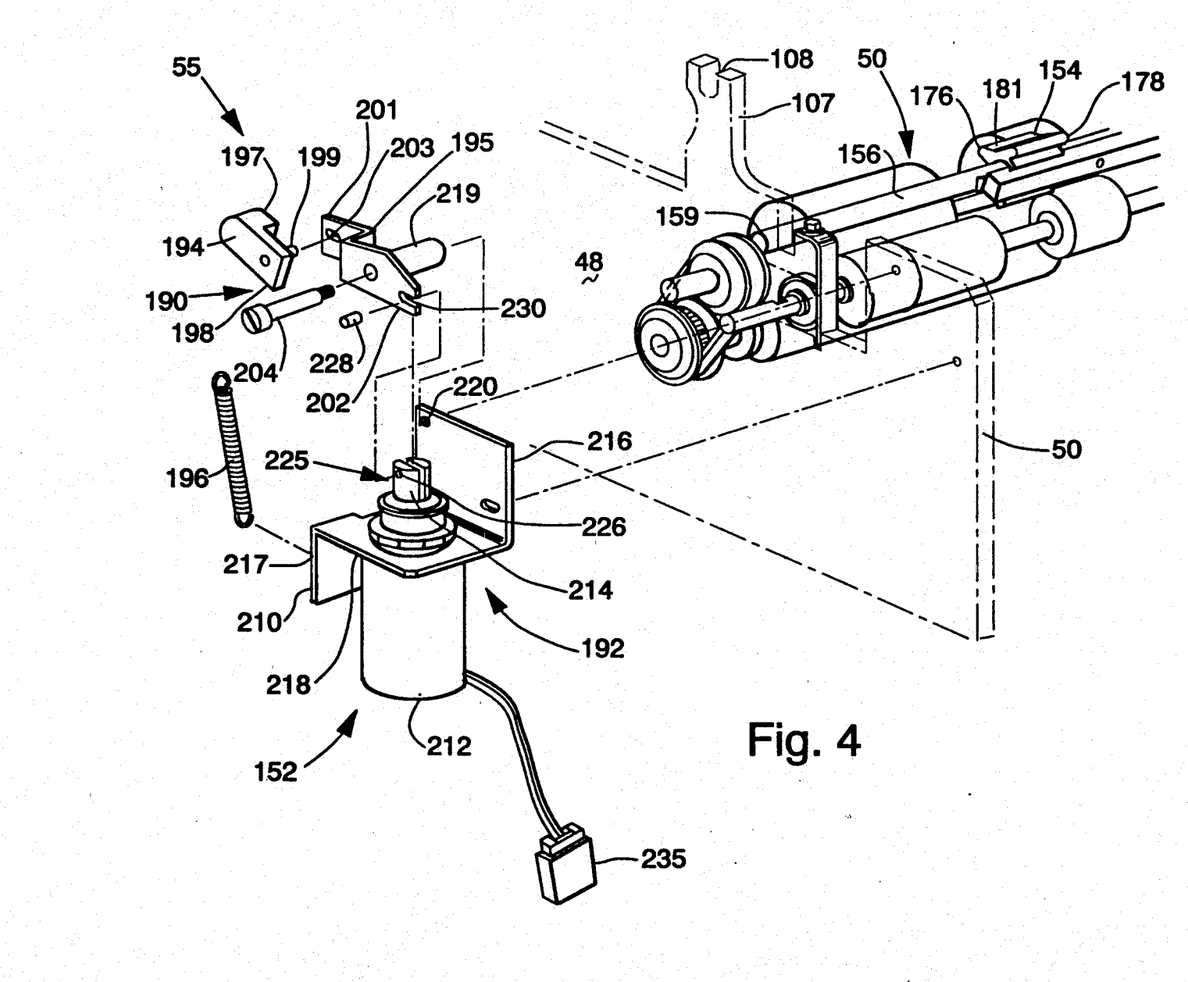
FIG. 4 is an exploded perspective view of the lower assembly of the diverter apparatus.

Referring to FIGS. 3, 3a and 4, the lower assembly 65 of the diverting apparatus 30 includes the second roller 52, the fourth roller 54, the motor assembly 75 for the second roller 52 and the diverter assembly 55. The fourth roller 54 segments 66 form second exit nips 126 (shown in FIG. 5a) with the second roller segments 66. The left 49 and right 50 sides of the subframe 48 have cutout portions 130 which form slots 132 in which the bearings 72 on the shafts 70 of the second 52 and fourth 54 rollers reside. The segments 66 of the fourth 54 roller are kept in frictional contact with the segments 66 of the second 52 roller by a cantilevered spring 98 mounted across each of the slots 132 in the subframe 48. The cantilevered springs 98 bias the segments 66 of the fourth roller 54 against the segments 66 of the second roller 52 by restricting the bearings 72 of the second 52 and fourth 54 rollers in the slots 132. The motor assembly 75 which drives the second roller 52 includes a motor 135, a first pulley 137 and a second pulley 138. The motor 135 is mounted to the right side 50 of the subframe 48 and has a drive shaft on which the first pulley 137 is mounted. An end 139 of the shaft 70 of the second roller 52 passes through the bearing 72 residing in the slot 132 in the right side 50 of the subframe 48 and extends past an exterior of the right side 50 of the subframe 48. The second pulley 138 is mounted on an extended portion near the end 139 of the shaft 70 of the second roller 52. A drive belt 140 engages the first pulley 137 and the second pulley 138. The second roller 52 has an idle clutch 142 (shown in FIG. 5a) which permits the second roller 52 to freewheel when a pair of rollers independent from the diverting apparatus 30 continue to transport the sheet. For example, in the case where a film sheet is diverted by the diverting apparatus 30 to the intermediate film storage apparatus 12, initially the film is driven by the second roller 52 until the film is at the nip of the pair of entrance rollers 47 in the storage apparatus 12. The clutch 142 on the second roller 52 of the diverting apparatus 30 is then engaged so that the second roller 52 freewheels and freely allows the pair of entrance rollers 47 to continue the transport of the sheet into the storage apparatus 12.

Referring to FIG. 4, the diverter assembly 55 includes a diverter member 150 and an action mechanism 152. The diverter member 150 has a shaft 156 on which a plurality of diverter segments 154 are seated. The diverter segments 154 are positioned on the diverter shaft 156 so that the segments 54 or portions thereof are located or can be moved into the gaps 68 of at least one of the first 51, second 52, third 53 and fourth 54 rollers. It is preferred that the number of diverter segments 154 on the shaft 156 equals the number of gaps 68 associated with each of the first 51, second 52, third 53 and fourth 54 rollers. It should be understood that the number of diverter segments 154 can be less than the number of gap portions 68 associated with each of the first 51, second 52, third 53 and fourth 54 rollers. The diverter segments 154 are secured in place on the shaft 156 by a bar 160 which is mounted to the shaft 156. The bar 160 provides for the alignment and positioning of the diverter segments 154 on the shaft 156. Referring to FIG. 3, the diverter shaft 156 has a first end 158 and a second end 159. A bearing 162 which is mounted on the first end 158 of the shaft 156 resides in a second groove 164 in the left side 49 of the subframe 48. The second end 159 of the shaft 156 resides in the second groove 164 in the right side 50 of the subframe 48 and extends past the exterior right side 50 of the subframe 48.

Referring to FIG. 3a, the diverter segment 154 is substantially triangle-shaped and has a first side 171, a second side 172 and a third side 173. The first 171 and second 172 sides of the diverter segment 154 form a first leg 176. The second 172 and third 173 sides form a second leg 177. The third 173 and first 171 sides form a third leg 178. At least one of the first 176, second 177 or third 178 legs or a portion thereof of the diverter segment 154 on the diverter member 150 is located in one of the gaps 68 of any one of the first 51, second 52, third 53, or fourth 54 rollers. Typically however, two or three or more of the first 176, second 177, and third 178 legs of the diverter segments 154 are located in gaps 68 of the rollers 51, 52, 53, 54. The first 171 and second 172 sides have first 181 and second 182 arcuate surfaces respectively. The first arcuate surface 181 and a second arcuate surface 182 are shaped the same or substantially the same. The first 181 and second 182 arcuate surfaces are shaped so that there is minimal contact of the leading edge of the film on the arcuate surface 181,182 when the film is being diverted by the diverter member 150, for instance, as depicted in FIG. 5e. The first side 171 has a first planar area 184 and a second planar area 185 smaller than the first planar area 184. The first arcuate surface 181 interconnects the first planar area 184 and the second planar area 185. The second side 172 has a first planar area 186 and a second planar area 187 smaller than the first planar area 186. The second arcuate surface 182 interconnects the first planar area 186 and the second planar area 187. The third side 173 of the diverter segment 154 has a cavity 183 which is shaped substantially the same as the diverter shaft 156 so that the diverter segment 154 can seat on the diverter shaft 156.

Referring to FIG. 4, the action mechanism 152 moves the diverter member 150 to position the first arcuate surface 181 or the second arcuate surface 182 of the diverter segments 154 toward the path of the sheet to thus divert the sheet to the first exit nips 86 or the second exit nips 126, respectively. The action mechanism 152 includes a linkage assembly 190 and a solenoid assembly 192. The linkage assembly 190 includes a first arm 194, a second arm 195 and a spring 196. The first arm 194 has a first end 197 and a second end 198. The first end 197 of the first arm 194 is coupled to the second end 159 of the diverter shaft 156. A pin 199 is mounted on the second end 198 of the first arm 194. The second arm 195 has a first end 201 and a second end 202. The first end 201 of the second arm 195 has a slot 203 for engaging the pin 199 on the second end 198 of the first arm 194. A pivot pin 204 is located on the second arm 195 between the first 201 and second 202 ends of the second arm 195 and is mounted on the exterior of the right side 50 of the subframe 48. The solenoid assembly 192 includes a support bracket 210, a solenoid 212 and a plunger 214. The support bracket 210 has a first member 216, a second member 217 and a platform 218. The first member 216 of the support bracket 210 is mounted to the subframe 48. A shaft of the pivot pin 204 on the second arm 195 passes through the second arm 195, a standoff member 219 and an opening 220 in the first member 216 of the support bracket 210 before mounting to the subframe 48. The spring 196 is mounted to the second arm 195 and to the second member 217 of the solenoid bracket 210. The solenoid 212 is mounted to the platform 218 of the support bracket 210 so that a portion 225 of the plunger 214 of the solenoid 212 is exposed and can couple to the linkage assembly 190. The exposed portion of the plunger 214 has a passageway 226 in which a roll pin 228 is mounted transverse through the passageway 226. The second end 202 of the second arm 195 of the linkage assembly 190 has a slit 230 for engaging the roll pin 228 in the passageway 226 of the plunger 214. Power is supplied to the solenoid by a plug 235. The solenoid 212 imparts a vertical motion to the plunger 214.

Figure 5A:
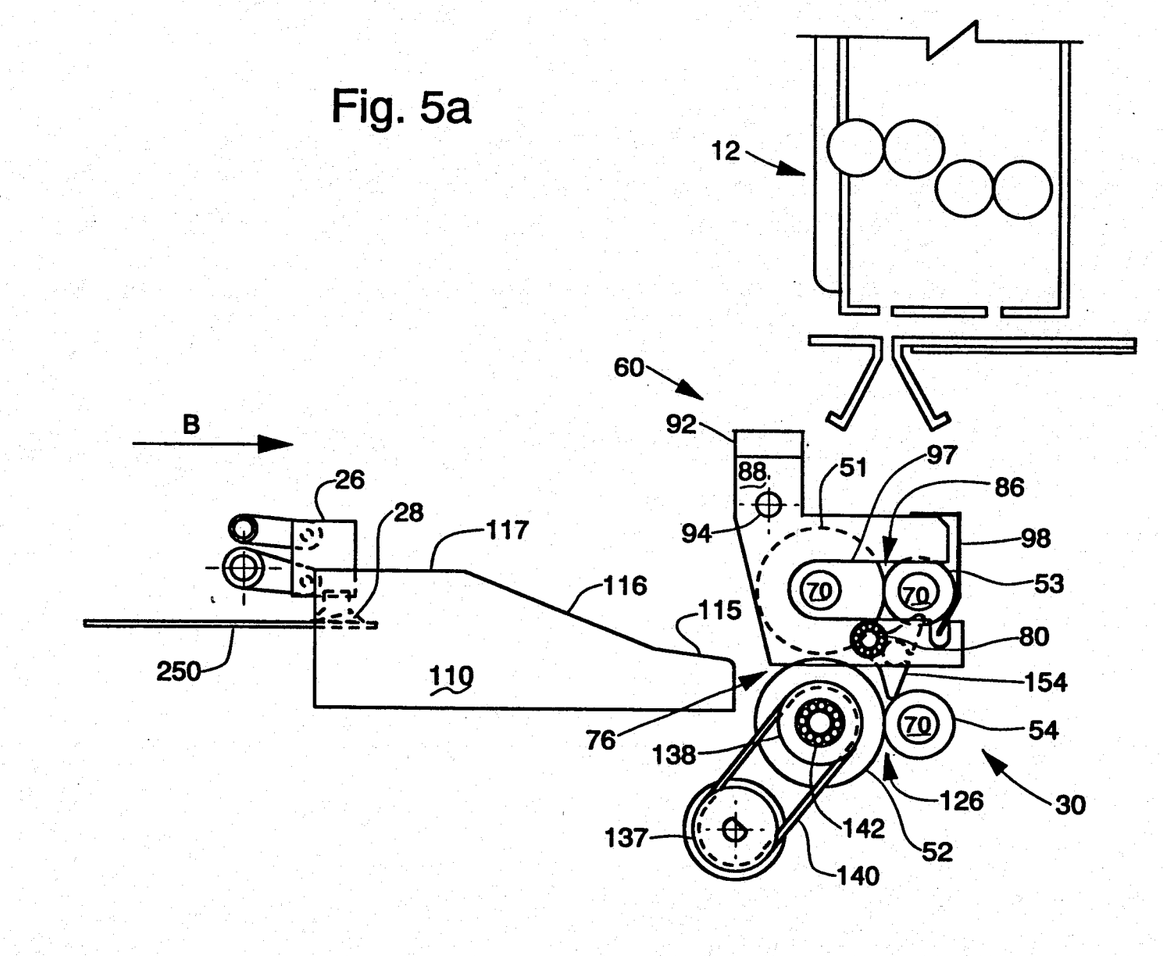
FIG. 5a is a schematic representation illustrating a step of transporting a sheet with a vacuum-operated lifting assembly along an incoming path to the diverter apparatus.
Figure 5B:
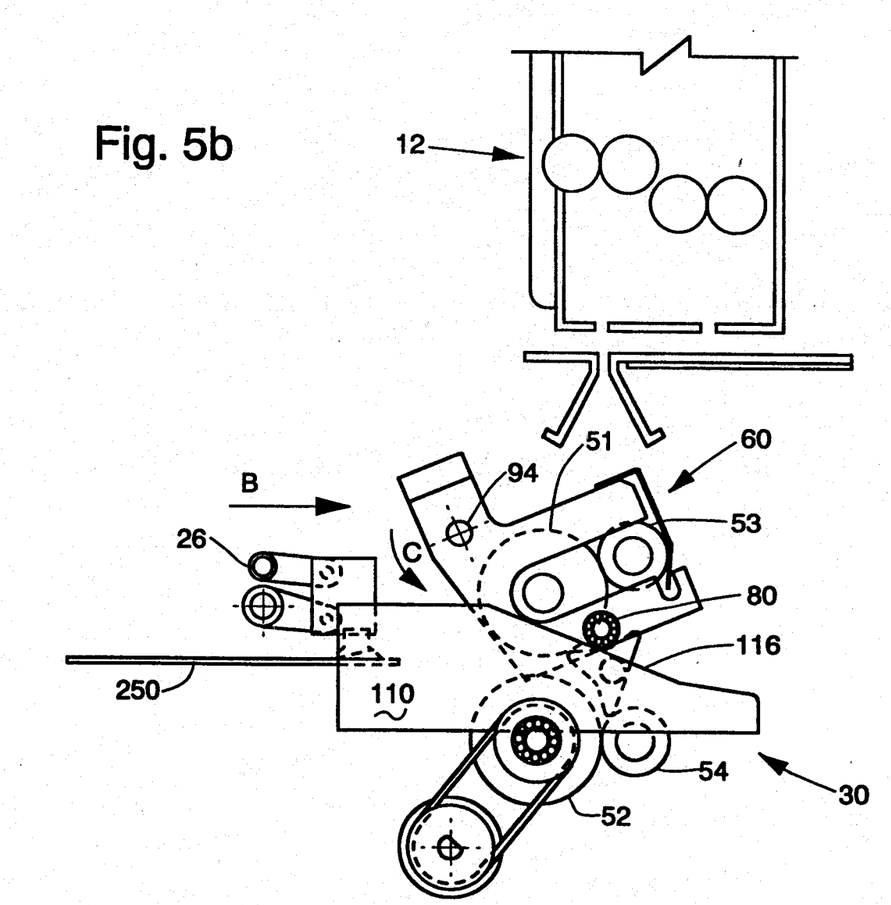
FIG. 5b is a schematic representation illustrating a step of separating a first roller and a second roller associated with the incoming path.
Figure 5C:
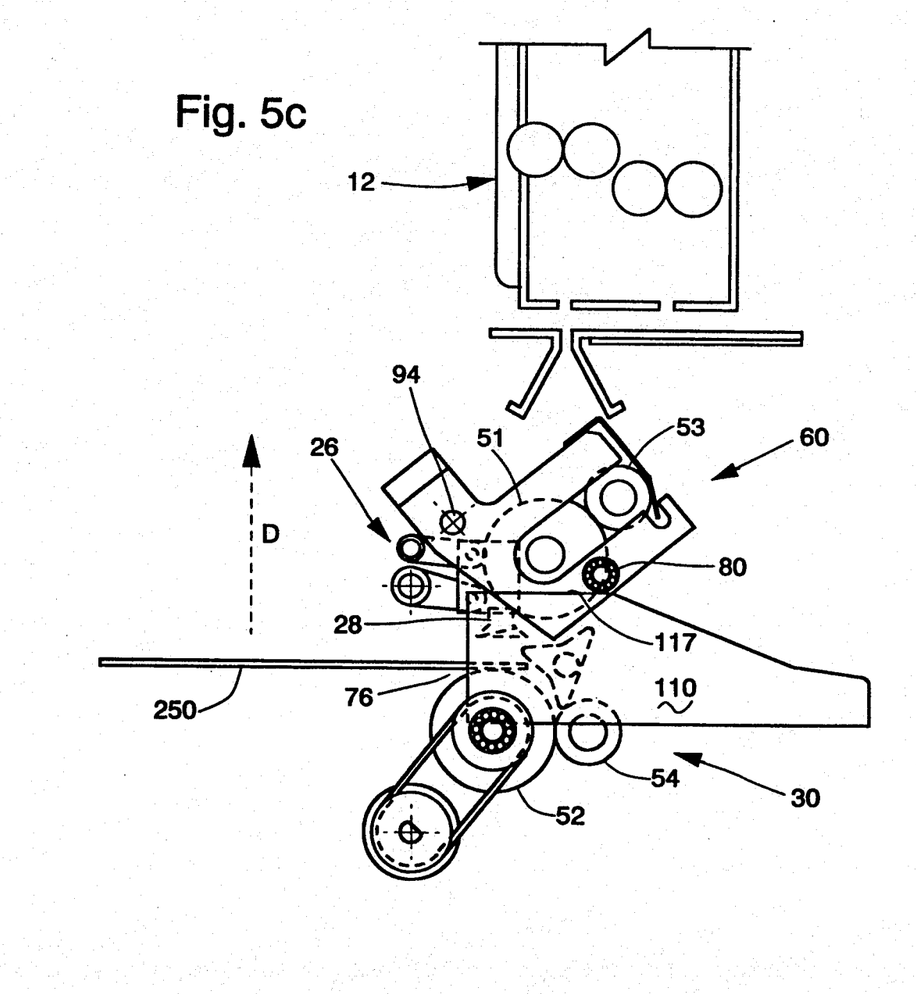
FIG. 5c is a schematic representation illustrating a step of placing the sheet between the first and second rollers.
Figure 5D:
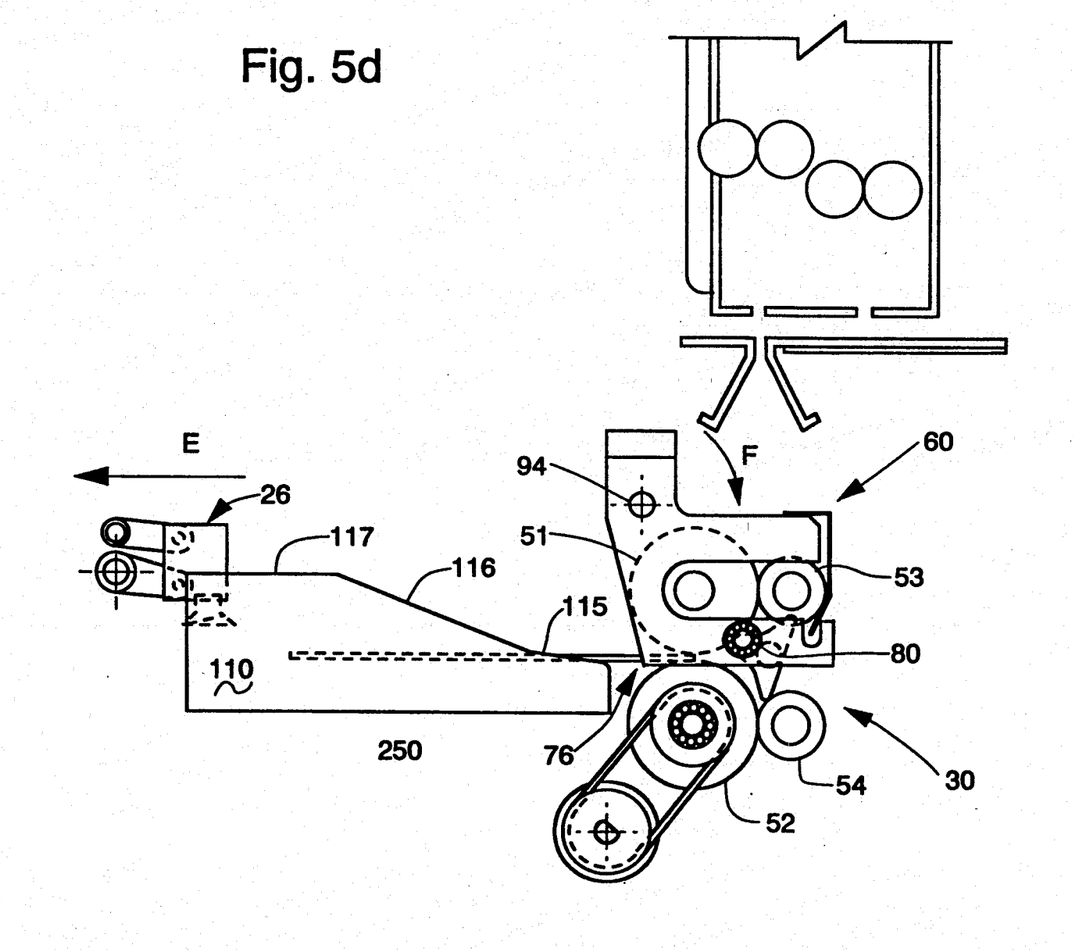
FIG. 5d is a schematic representation illustrating steps of capturing the sheet in incoming nips between the first and second rollers and returning the vacuum-operated lifting assembly to its initial position.
Figure 5E:
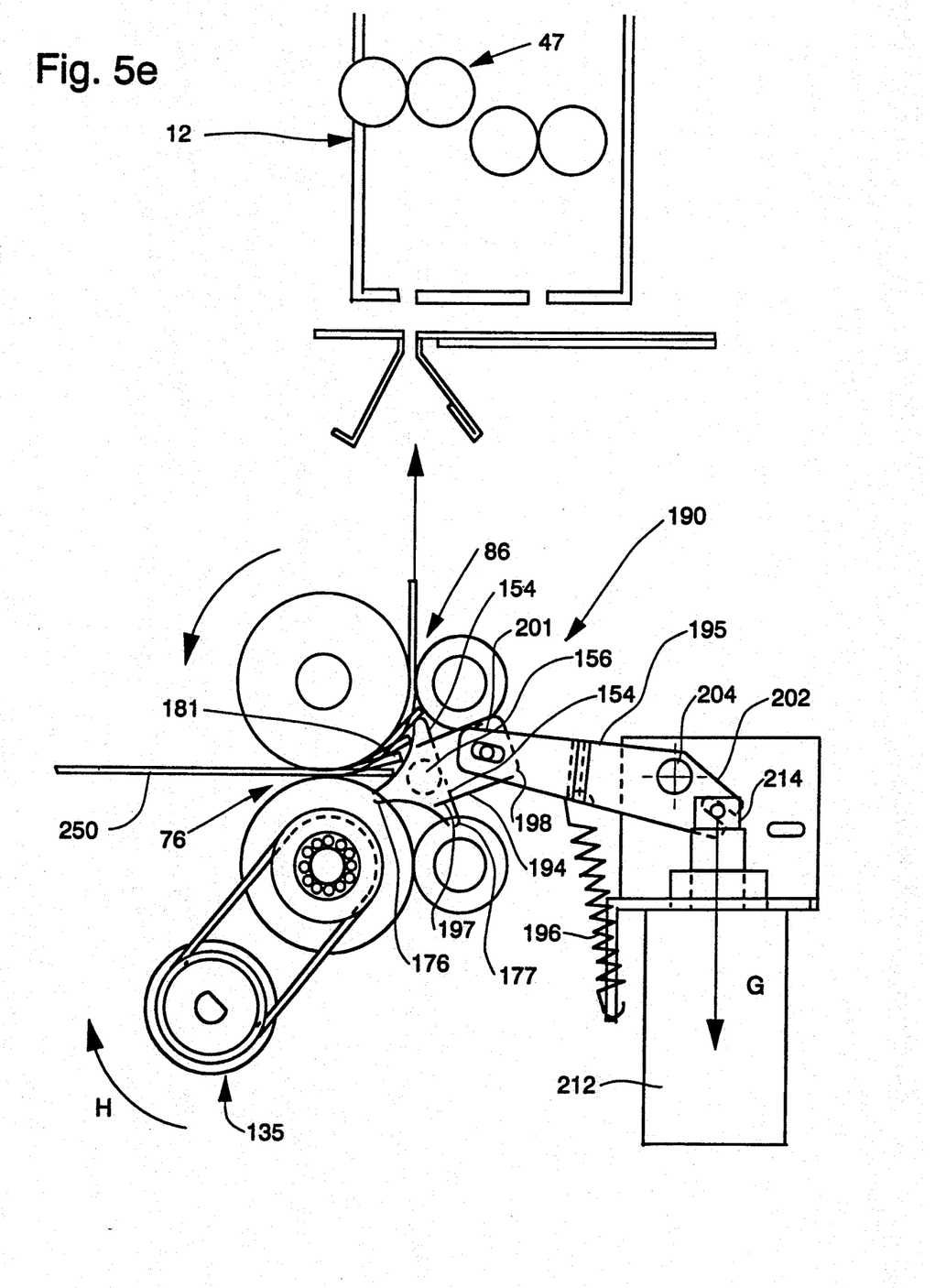
FIG. 5e is a schematic representation illustrating a step of diverting the sheet from the incoming nips to first exit nips.

The operation of the diverting apparatus 30 can best be understood by referring to FIGS. 5a through 5g. An exposed film 250 has been removed from the opened cassette 24 by the vacuum-operated lifting assembly 26. In FIG. 5a, the film 250 is secured with a vacuum to and carried by at least one lifting element 28 of the lifting assembly 26 which is transported by the carrier transporting mechanism (not shown) in the direction of arrow B to the diverting apparatus 30 of this invention. As the film 250 is transported on an incoming path, the lifting assembly 26 nears the diverting apparatus 30 and the cam follower bearing 80 is aligned to engage the first surface 115 of the cam 110. In FIG. 5b, the lifting assembly 26 continues moving to the diverting apparatus 30 so that the cam follower bearing 80 rides up the ramp surface 116 of the cam 110. The upper assembly 60 starts pivoting in direction of arrow C about the yoke shaft 94 residing in first grooves 108 in the extended portions 107 of the subframe 48. As the upper assembly 60 is pivoting, the first roller 51 is separating from the second roller 52. In FIG. 5c, the lifting assembly 26 continues moving to the diverting apparatus 30, the cam follower bearing 80 rides on the second surface 117 of the cam 110 and the upper assembly 60 has completed pivoting to separate the first roller 51 from the second roller 52. The lifting elements 28 or portions thereof are located on the lifting assembly 26 so that the lifting elements 28 can be positioned into the gaps 68, i.e., between the segmented portions 66 of the first roller 51. The lifting elements 28 of the lifting assembly 26 carry the incoming film 250 to the diverting apparatus 30 at a slightly elevated position than the incoming nips 76 of the first 51 and second 52 rollers. When the lifting elements 28 are moved into position in the gaps 68 of the first roller 51, the lifting assembly 26 lowers the lifting elements 28, releases the vacuum by the lifting elements 26 on the incoming film, and retracts (as indicated by arrow D) the lifting elements 26 to their incoming position. Thus, the lifting assembly 26 places the incoming film on the second roller 52, at the location of the incoming nips 76, between the raised first roller 51 and the second roller 52. In FIG. 5d, the carrier transporting mechanism removes (as indicated by arrow E) the lifting assembly 26 from the diverting apparatus 30 and returns the lifting assembly 26 to a start position by the cassette opening-closing assembly 22. In so doing, the cam follower bearing 80 returns the ride on the second surface 117, down the ramp surface 116, and on the first surface 115, to pivot the upper assembly 60 in direction of arrow F. Thus, the first roller 51 captures the incoming film 250 in the incoming nips 76 between the segments 66 of the first 51 and second 52 rollers when the first roller 51 returns adjacent to second 52 roller.

Figure 5F:
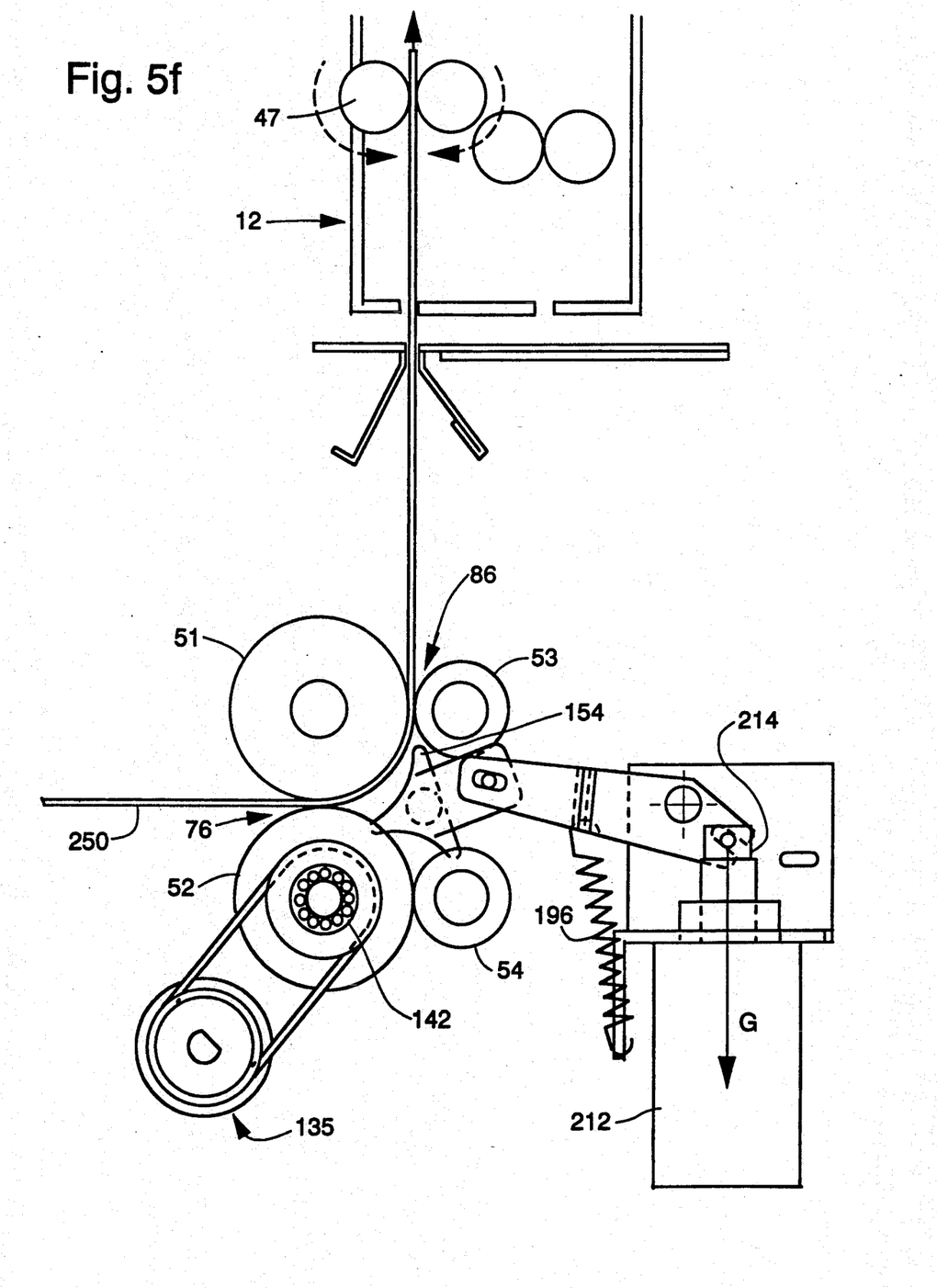
FIG. 5f is a schematic representation illustrating a step of transporting the sheet from the first exit nips to a storage apparatus.

As was discussed earlier, a sensor (not shown) detects the presence of the film 250 at the nip between the first 51 and second 52 rollers and sends the film presence information to the microcomputer (not shown). The microcomputer also receives information from a second sensor (not shown) on the presence of another film in a feed tray 40 of the processor 42 associated with the film handling apparatus 10. See FIG. 1. The microcomputer determines whether the film 250 can be transported directly into the processor 42 or should be transported into the storage apparatus 12 associated with the film handling apparatus 10 for dispensing at a later time, and directs the movement of the diverting assembly 55 via the solenoid 212, to thereby guide the exposed film 250 to the appropriate path accordingly. In FIGS. 5e and 5f, the film 250 is diverted to the first exit nips 86, thus directing the transport of the film to the storage apparatus 12 associated with the film handling apparatus 10. A first position of the diverter member 150 has the diverter segments 154 positioned to direct a film from the incoming nips 76 along the first arcuate surfaces 181 of the diverter member 150 to the first exit nips 86. In the first position, the solenoid 212 is energized to move the plunger 214 of the solenoid in the lowest position as indicated by arrow G. The second end 202 of the second arm 195 of the linkage assembly 190 is rotated down about the pivot pin 204 and the spring 196 is extended. In this situation, the first end 201 of the second arm 195 and the second end 198 of the first arm 194 are moved up with respect to the pivot pin 204. The first end 197 of the first arm 194 has pivoted the diverter shaft 156 in the second grooves 164 of the subframe 48. Thus, the diverter segments 154 on the diverter shaft 156 are moved counter-clockwise in FIG. 5e. The first 176 and second 177 legs of the diverter segments 154 are positioned into the gaps 68 of the second 52 and fourth 54 rollers, respectively, and the first arcuate surface 181 of the diverter segment 154 is positioned to be contacted by the leading edge of the film 250. The motor assembly 135 connected to the second roller 52 is energized to rotate the second roller 52 in the direction of arrow H, and drives the leading edge of the film 250 at the incoming nips 76 to and along the first arcuate surface 181 of the diverter segments 154 on the diverter shaft 156, into the first exit nips 86 of the first 51 and third 53 rollers, and wrapping the film 250 on the first roller 51 to transport the film 250 out of the diverting apparatus 30. Since the film 250 is being transported vertically or substantially vertically upward, the film 250 is driven by nip rollers 51,52 of the diverter apparatus 30 until the film 250 reaches the pair of nip rollers 47 in the storage apparatus 12. With this arrangement, as clearly shown in FIG. 5e, only the leading edge of the film 250 and possibly a very short distance (i.e., no more than several times the thickness of the film 250) along the sides of the film 250 immediately adjacent the leading edge of the film 250 ever contact the diverter segments 154. Once the film is caught in the first exit nip 86, the film 250 wraps itself along the surface of the first roller 51. This eliminates or significantly reduces scratches on the sides of the film 250 as the film is transported through the sheet diverting apparatus 30.

As shown in FIG. 5f, in this case the film 250 is driven by the first 51 and third 53 rollers until the film 250 is in a nip of the entrance nip rollers 47 in the storage apparatus 12 and is then transported by the entrance rollers 47.

Figure 5G:
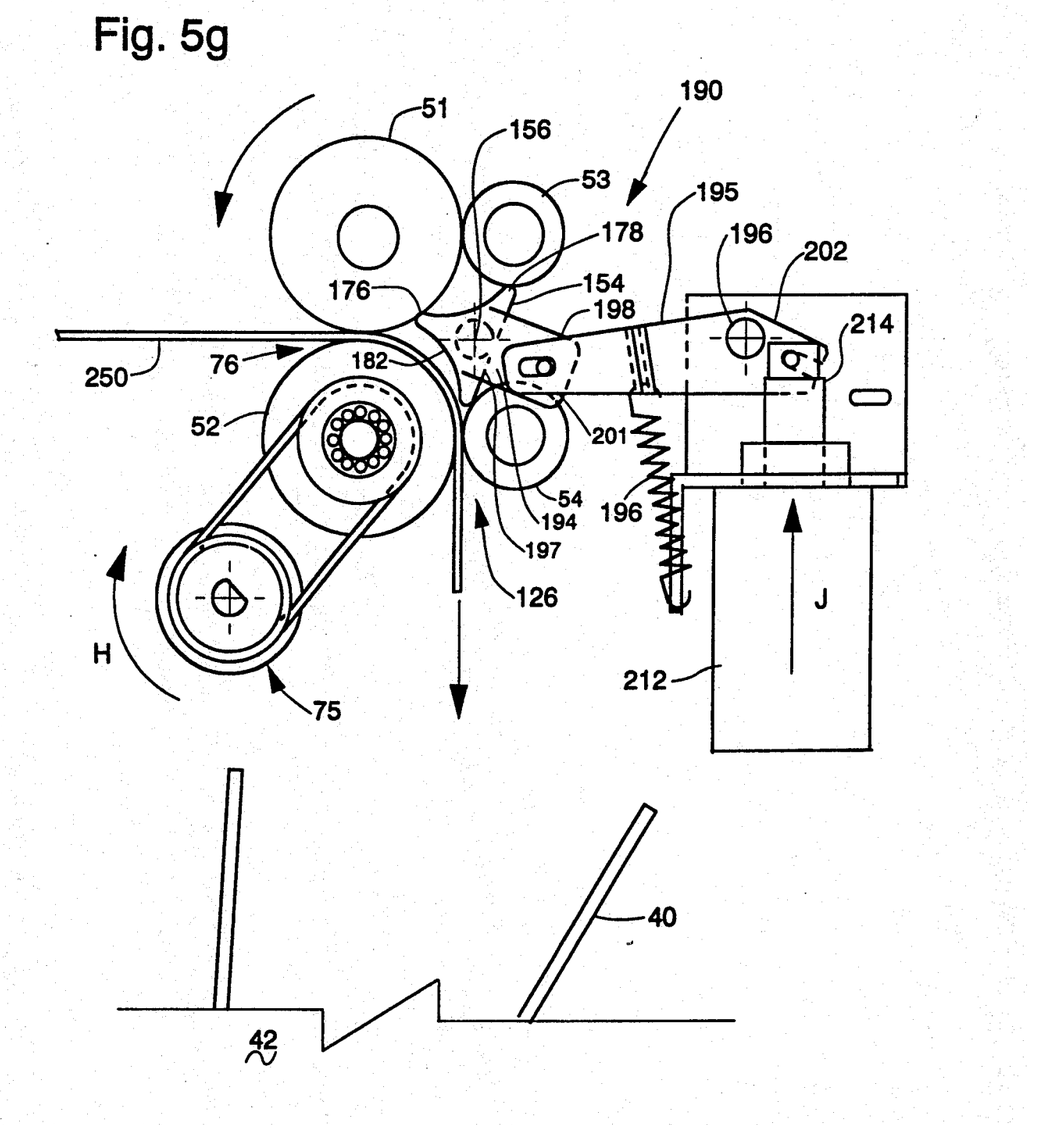
FIG. 5g is a schematic representation illustrating a step of diverting the sheet from the incoming nips to second exit nips.

In FIG. 5g, the film 250 is being diverted from the incoming nips 76 to the second exit nips 126, thus directing the transport of the film to the processor 42. The position of the diverter assembly 55 illustrated in FIG. 5g is its second or rest position in which the diverter assembly 55 is typically positioned except when a film is to be diverted to the film storage apparatus 12. The rest position of the diverter member 150 has the diverter segments 154 positioned to direct a film 250 from the incoming nips 76 along the second arcuate surface 182 to the second exit nips 126. In the rest position, the plunger 214 of the solenoid 212 is not energized and is in its highest position as indicated by arrow J. The second end 202 of the second arm 195 of the linkage assembly 190 is rotated up about the pivot pin 196 and the spring 196 is relaxed. The first end 201 of the second arm 195 and the second end 198 of the first arm 194 are pivoted downward about the pivot pin 196. The first end 197 of the first arm 194 has pivoted the diverter shaft 156 in the second grooves 164 of the subframe 48. The first 176 and third 178 legs of the diverter segments 154 are positioned into the gaps 68 of the first 51 and third 53 rollers, respectively, and the second arcuate surface 182 of the diverter segment 154 is positioned to be contacted by the leading edge of the film. The motor assembly 75 connected to the second roller 52 is energized to rotate the second roller 52 in the direction of arrow H, driving the leading edge of the film at the incoming nips 76 to and along the second arcuate surface 182 of the diverter segments 154 of the diverter member 150, into the second exit nips 126 of the second 52 and fourth 54 rollers, and wrapping the film on the second 52 roller to transport out of the diverting apparatus 30. Again, only the leading edge of the film 250 and possibly a very short distance (i.e., no more than several times the thickness of the film 250) along the sides of the film 250 immediately adjacent the leading edge of the film 250 ever contact the diverter segments 154. Once the film is caught in the second exit nip 126, the film 250 wraps itself along the surface of the second roller 52. This eliminates or significantly reduces scratches on the sides of the film 250 as the film is transported through the sheet diverting apparatus 30.

Since the film processor 42 is below the diverting apparatus 30, the film 250 after being driven by the first 51 and second 52 rollers and then the second 52 and fourth 54 rollers, drops by gravity into a chute associated with the feed tray 40 of the film processor 42.

Those skilled in the art, having benefit of the teachings of the present invention as hereinabove set forth, can effect numerous modifications thereto. These modifications are to be construed as being encompassed within the scope of the present invention as set forth in the appended claims.

What is claimed is:

1. An apparatus for diverting a sheet having a leading edge to a first position or a second position, comprising:
   a first roller having segments separated by first gaps;
   a second roller having segments separated by second gaps, the second roller segments forming incoming nips with the first roller segments;
   a third roller having segments separated by third gaps, the third roller segments forming first exit nips with the first roller segments;
   a fourth holler having segments separated by fourth gaps, the forth roller segments forming second exit nips with the second roller segments;
   a diverter assembly having diverter segments positionable within at least one of the first gaps, the second gaps, the third gaps and the fourth gaps, the diverter assembly for directing the leading edge of the sheet from the incoming nips to the first exit nips or the second exit nips;
   a subframe for rotatably supporting the second and fourth rollers;
   a yoke assembly for rotatably supporting the first and third rollers, the yoke assembly pivotally supported by the subframe;
   a cam follower connected to the yoke assembly; and
   a cam for contacting the cam follower for causing the yoke assembly to pivot separating the first roller from the second roller.

2. The apparatus of claim 1, wherein the diverter assembly further comprises means for positioning the diverter segments within at least one of the first gaps, the second gaps, the third gaps and the fourth gaps.

3. The apparatus of claim 2, wherein the positioning means comprises:
   a diverter shaft, the diverter segments connected to the diverter shaft;
   means for pivoting the diverter shaft such that the diverter segments are capable of being rotated to a first position to direct the leading edge to the first exit nips and to a second position to direct the leading edge to the second exit nips.

4. The apparatus of claim 1, further comprising means for rotating the second roller.

5. The apparatus of claim 1, further comprising means for positioning the diverter segments within at least one of the first gaps, the second gaps, the third gaps and the fourth gaps.

6. The apparatus of claim 5, wherein the positioning means comprises:
   a diverter shaft, the diverter segments connected to the diverter shaft;
   means for pivoting the diverter shaft such that the diverter segments are capable of being rotated to a first position to direct the leading edge to the first exit nips and to a second position to direct the leading edge to the second exit nips.

7. The apparatus of claim 6, further comprising means for rotating the second roller.

* * * * *